United States Patent
Dethe et al.

(10) Patent No.: US 9,734,022 B1
(45) Date of Patent: Aug. 15, 2017

(54) IDENTIFYING VIRTUAL MACHINES AND ERRORS FOR SNAPSHOTS

(71) Applicant: EMC Corporation, Hopkinton, MA (US)

(72) Inventors: Tushar Dethe, Bangalore (IN); Sunil Yadav, Bangalore (IN); Soumen Acharya, Bangalore (IN); Anupam Chakraborty, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 155 days.

(21) Appl. No.: 14/674,066

(22) Filed: Mar. 31, 2015

(51) Int. Cl.
G06F 11/14 (2006.01)

(52) U.S. Cl.
CPC ...... *G06F 11/1484* (2013.01); *G06F 11/1435* (2013.01); *G06F 11/1451* (2013.01); *G06F 11/1464* (2013.01); *G06F 11/1469* (2013.01); *G06F 2201/815* (2013.01); *G06F 2201/84* (2013.01)

(58) Field of Classification Search
USPC .................................... 714/20, 6.3
See application file for complete search history.

(56) References Cited

U.S. PATENT DOCUMENTS

| | | | | |
|---|---|---|---|---|
| 8,219,769 B1* | 7/2012 | Wilk | ...... | G06F 11/1464 707/640 |
| 2005/0028026 A1* | 2/2005 | Shirley | ...... | G06F 11/1469 714/6.3 |
| 2013/0054529 A1* | 2/2013 | Wang | ...... | G06F 11/1448 707/639 |
| 2013/0185716 A1* | 7/2013 | Yin | ...... | G06F 9/45558 718/1 |

* cited by examiner

*Primary Examiner* — Kamini Patel
(74) *Attorney, Agent, or Firm* — Dergosits & Noah LLP; Todd A. Noah

(57) ABSTRACT

Identifying virtual machines and errors for snapshots is described. A system receives, from a volume snapshot service, an error message and a corresponding component identifier associated with a backup operation. The system requests a corresponding snapshot status from each component participating in the backup operation. The system receives a corresponding snapshot status from each component participating in the backup operation. The system requests an error identifier from a component corresponding to a snapshot failure status. The system receives the error identifier from the component corresponding to the snapshot failure status. The system identifies a virtual machine based on the component identifier. The system outputs, via a user interface, a report identifying the virtual machine and the error identifier.

20 Claims, 3 Drawing Sheets

IDENTIFYING VIRTUAL MACHINES AND ERRORS FOR SNAPSHOTS

BACKGROUND

If a software error corrupts a data object, or if erroneous data updates the data object, a data protection administrator may restore the data object to a previous uncorrupted state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A virtual machine is a software implementation of a computer that executes programs like a physical machine. A system virtual machine provides a complete system platform which supports the execution of a complete operating system, and usually emulates an existing architecture. Multiple instances of virtual machines lead to more efficient use of computing resources, both in terms of energy consumption and cost effectiveness, known as hardware virtualization, the key to a cloud computing environment. Similar to other data objects, backup copies are made of virtual machine databases to enable a restoration of the virtual machine in the event of corruption or an erroneous update to the virtual machine.

A snapshot is a capture of a state of a data object, such as a file system, a virtual machine, or an application, at a specific moment in time. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create snapshots of data objects stored on multiple storage arrays.

DETAILED DESCRIPTION

Figure 1:
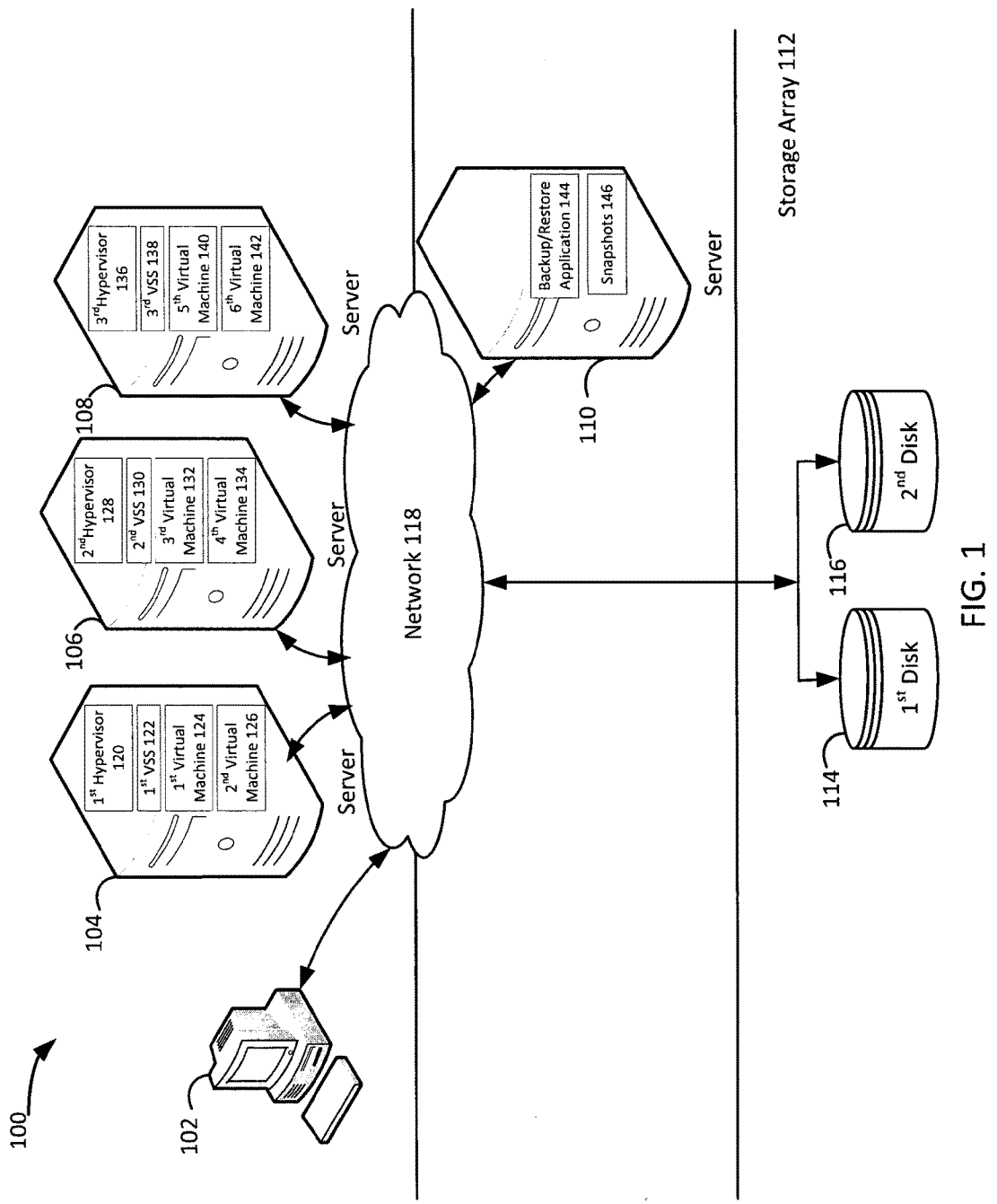
FIG. 1 illustrates a block diagram of an example system for identifying virtual machines and errors for snapshots, under an embodiment.

Challenges exist for a backup/restore application which uses a volume snapshot service to back up virtual machines. If a snapshot operation fails for a single virtual machine which is participating in a backup operation, then the backup operation may fail for all of the virtual machines participating in the backup operation, thereby resulting in an unprotected environment for all of these virtual machines, which sometimes results in data loss. Therefore, a backup/restore application may use a volume snapshot service which has a partial writer backup feature, such as Microsoft® Volume Shadow Copy Service, to store the snapshots which succeeded for most of the virtual machines even though some snapshots may have failed for some of the virtual machines. However, a volume snapshot service which has the partial writer backup feature reports the component identifier, and not the corresponding virtual machine, for a snapshot which failed. For example, a volume snapshot service which has the partial writer backup feature reports the error message "VSS_E_WRITER_ERROR_PARTIAL_FAILURE" and the component identifier 2365F497-E699-4731-BDA1-C958EFA55EF8 for a snapshot operation which failed. Therefore, a system user cannot easily identify for which virtual machine the snapshot failed or the specific error responsible for the failure, which is particularly frustrating for a system user responsible for monitoring an environment which includes significantly large numbers of virtual machines on the same host or distributed in a cluster. In a cluster shared volumes environment, a system user has to check the logs for every cluster node participating in the backup operation to get the snapshot status for a particular virtual machine to identify for which virtual machine the snapshot failed and the specific error responsible for the failure.

Embodiments herein identify virtual machines and errors for snapshots. An error message and a corresponding component identifier associated with a backup operation are received from a volume snapshot service. A corresponding snapshot status is requested from each component participating in the backup operation. A corresponding snapshot status is received from each component participating in the backup operation. An error identifier is requested from a component corresponding to a snapshot failure status. The error identifier is received from the component corresponding to the snapshot failure status. A virtual machine is identified based on the component identifier. A report identifying the virtual machine and the error identifier is output via a user interface.

For example, a backup/restore application receives the error message "VSS_E_WRITER_ERROR_PARTIAL_FAILURE" and the component identifier 2365F497-E699-4731-BDA1-C958EFA55EF8 for a snapshot operation from a volume shadow copy service. The backup/restore application requests each component participating in the snapshot operation to provide their snapshot status. The backup/restore application receives a snapshot status from each component participating in the snapshot operation, including a snapshot failure status from the component identified by the component identifier 2365F497-E699-4731-BDA1-C958EFA55EF8. The backup/restore application requests an error identifier from the component identified by the component identifier 2365F497-E699-4731-BDA1-C958EFA55EF8. The backup/restore application receives the error identifier #8193, for unexpected calling routine, from the component identified by the component identifier 2365F497-E699-4731-BDA1-C958EFA55EF8. The backup/restore application identifies virtual machine #2 based on the component identifier 2365F497-E699-4731-BDA1-C958EFA55EF8. The backup/restore application outputs a report identifying virtual machine #2 and the error "unexpected calling routine" via a user interface. The backup/restore application identifies for which virtual machines the snapshots failed, identifies the specific error responsible for the failures, and may also identify for which virtual machines the snapshots succeeded. The backup/restore application overcomes the existing problem of identifying for which virtual machines the snapshots failed and the specific errors responsible for the failures.

FIG. 1 illustrates a block diagram of a system that implements identifying virtual machines and errors for snapshots, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106, and a fourth client 108; and a server 110 and a storage array 112 that may be provided by a hosting company. Any of the second client 104, the third client 106, and the fourth client 108 may be associated with cluster shared volumes. The storage array 112 includes a first disk 114 and a second disk 116. The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the system 300 depicted in FIG. 3 and described below. Although FIG. 1 depicts the first client 102 as a personal computer 102, the second client 104 as a server 104, the third client 106 as a server 106, and the fourth client 108 as a sever 108, the first client 102 may be any type of computer and each of the clients 104-108 may be any type of computer capable of hosting virtual machines. The second client 104 includes a first hypervisor 120, a first volume snapshot service (VSS) 122, a first virtual machine 124, and a second virtual machine 126; the third client 106 includes a second hypervisor 128, a second volume snapshot service (VSS) 130, a third virtual machine 132, and a fourth virtual machine 134; and the fourth client 108 includes a third hypervisor 136, a third volume snapshot service (VSS) 138, a fifth virtual machine 140 and a sixth virtual machine 142.

The server 108 includes a backup/restore application 144 and snapshots 146. The backup/restore application 144 creates the snapshots 146 of virtual machines for the clients 104-108, and stores the snapshots 146 on the server 110, as depicted in FIG. 1, or stores the snapshots 146 remote to the server 110, which is not shown in FIG. 1. The system 100 enables the backup/restore application 144 to execute a rollback based on the snapshots 146. FIG. 1 depicts the system elements 144-146 residing completely on the server 110, but the system elements 144-146 may reside completely on the clients 102-108, completely on another server that is not depicted in FIG. 1, or in any combination of partially on the server 110, partially on the clients 102-108, and partially on the other server. Although the following paragraphs describe EMC Corporation's Avamar® backup/restore application and EMC Corporation's NetWorker® backup/restore application as examples of the backup/restore application 144, the backup/restore application 144 may be any other backup/restore application which provides the backup/restore functionalities described in the Background section.

The backup/restore application 144 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 144 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The first hypervisor 120, which is a Microsoft Hyper-V® hypervisor, creates the first virtual machine 124 and the second virtual machine 126 in the second client 104. Then the backup/restore application 144 initiates the first VSS 122, which is a Microsoft® Volume Shadow Copy Service with a partial writer backup failure feature, to create a snapshot of the first virtual machine 124 and the second virtual machine 126 in the second client 104. After the first volume shadow copy service 122 successfully creates a snapshot of the first virtual machine 124 in the second client 104, the first volume shadow copy service 122 encounters an unexpected calling routine when attempting to create a snapshot of the second virtual machine 126 in the second client 104. Consequently, the backup/restore application 144 receives the error message "VSS_E_WRITER_ERROR_PARTIAL_FAILURE" and the component identifier 2365F497-E699-4731-BDA1-C958EFA55EF8 for the failed snapshot operation from the first volume shadow copy service 122.

The backup/restore application 144 requests each component participating in the snapshot operation to provide their snapshot status, and these components correspond to the virtual machine 124-126. The backup/restore application 144 receives a snapshot success status from the first component, which corresponds to the first virtual machine 124, and a snapshot failure status from the second component, which corresponds to the second virtual machine 126, which is identified by the component identifier 2365F497-E699-4731-BDA1-C958EFA55EF8. The backup/restore application 144 requests an error identifier from the second component, which corresponds to the second virtual machine 126, which is identified by the component identifier 2365F497-E699-4731-BDA1-C958EFA55EF8. The backup/restore application 144 receives the error identifier #8193, which corresponds to "unexpected calling routine," from the second component, which corresponds to the second virtual machine 126, which is identified by the component identifier 2365F497-E699-4731-BDA1-C958EFA55EF8.

The backup/restore application 144 identifies the second virtual machine 126 based on the component identifier 2365F497-E699-4731-BDA1-C958EFA55EF8. The backup/restore application 144 outputs a report identifying the second virtual machine 126 with a snapshot failure status, the error "unexpected calling routine" as responsible for the failed snapshot, and optionally the first virtual machine 124 with a snapshot success status, via a user interface for the client 102. The backup/restore application 144 optionally stores the successful snapshot for to the first virtual machine 124 with the snapshot success status, but does not optionally store the failed snapshot for the second virtual machine 126 with the snapshot failure status.

Figure 2:
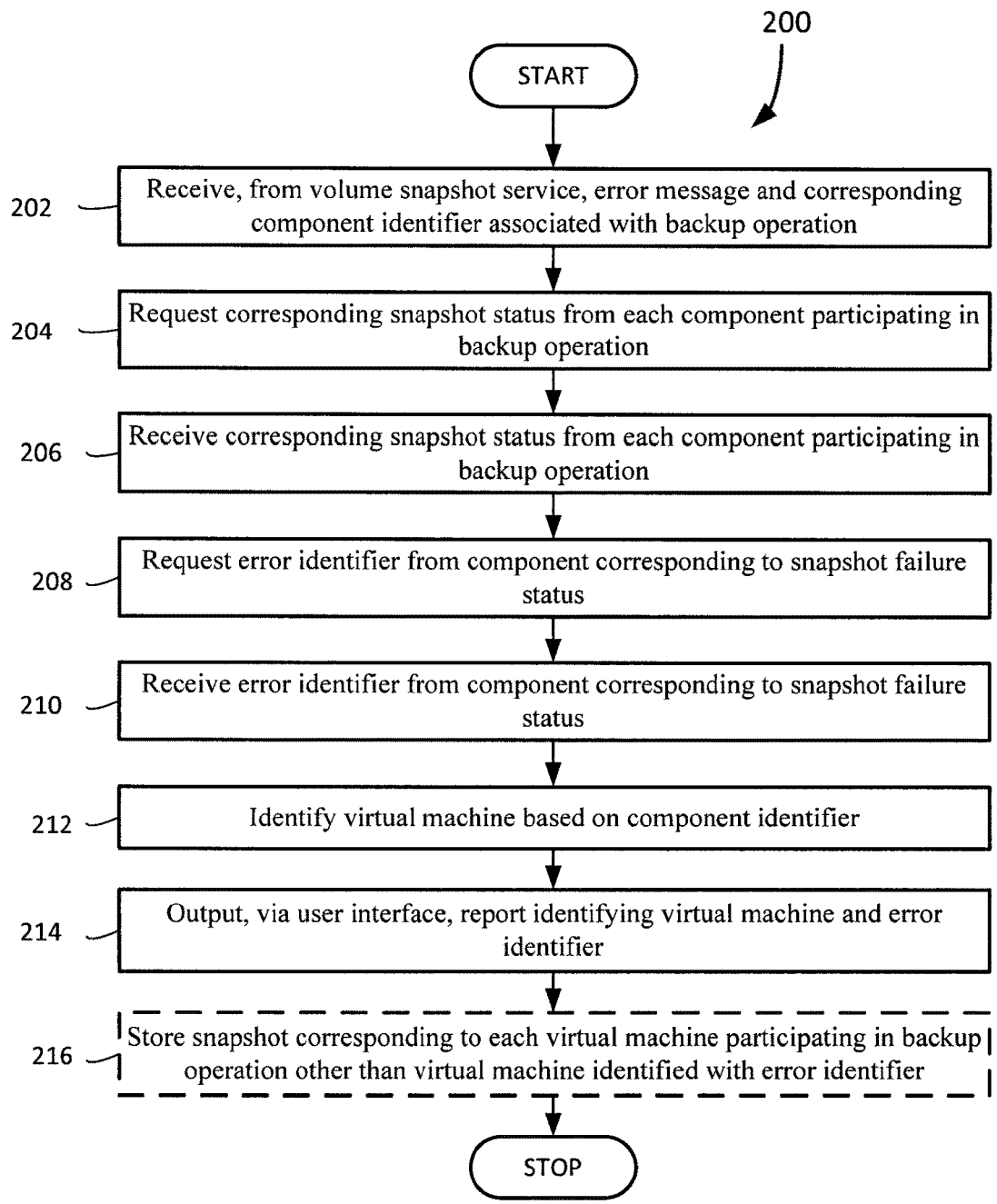
FIG. 2 is a flowchart that illustrates a method of identifying virtual machines and errors for snapshots, under an embodiment.

FIG. 2 is a flowchart that illustrates a method for identifying virtual machines and errors for snapshots, under an embodiment. Flowchart 200 illustrates method acts illustrated as flowchart blocks for certain steps involved in and/or between the clients 102-108 and/or the server 110 of FIG. 1.

The backup/restore application 144 receives, from a volume snapshot service, an error message and a corresponding component identifier associated with a backup operation, block 202. For example, the backup/restore application 144 receives the error message "VSS_E_WRITER_ERROR_PARTIAL_FAILURE" and the component identifier 2365F497-E699-4731-BDA1-C958EFA55EF8 for a snapshot operation from the first volume shadow copy service 122. After receiving the error message, the backup/restore application 144 requests a corresponding snapshot status from each component participating in a backup operation, block 204. For example, the backup/restore application 144 requests each component participating in the snapshot operation to provide their snapshot status, and these components correspond to the virtual machine 124-126.

Having requested snapshot statuses, the backup/restore application 144 receives a corresponding snapshot status from each component participating in a backup operation, block 206. For example, the backup/restore application 144 receives a snapshot success status from the first component, which corresponds to the first virtual machine 124, and a snapshot failure status from the second component, which corresponds to the second virtual machine 126, which is identified by the component identifier 2365F497-E699-4731-BDA1-C958EFA55EF8. Having received a snapshot failure status, the backup/restore application 144 requests an error identifier from a component corresponding to the snapshot failure status, block 208. For example, the backup/restore application 144 requests an error identifier from the second component, which corresponds to the second virtual machine 126, which is identified by the component identifier 2365F497-E699-4731-BDA1-C958EFA55EF8.

Having requested an error identifier, the backup/restore application 144 receives the error identifier from a component corresponding to a snapshot failure status, block 210. For example, the backup/restore application 144 receives the error identifier #8193, for unexpected calling routine, from the second component, which corresponds to the second virtual machine 126, which is identified by the component identifier 2365F497-E699-4731-BDA1-C958EFA55EF8. Having received a component identifier and a corresponding error identifier, the backup/restore application 144 identifies a virtual machine based on the component identifier, block 212. For example, the backup/restore application 144 identifies the second virtual machine 126 based on the component identifier 2365F497-E699-4731-BDA1-C958EFA55EF8.

Having received an error identifier and having identified the corresponding virtual machine, the backup/restore application 144 outputs, via a user interface, a report identifying a virtual machine and an error identifier, block 214. For example, the backup/restore application 144 outputs a report identifying the second virtual machine 126 and the error "unexpected calling routine" via a user interface for the client 102. Having output a report identifying a snapshot error, the backup/restore application 144 optionally stores a snapshot corresponding to each virtual machine participating in a backup operation other than a virtual machine identified with an error identifier, block 216. For example, the backup/restore application 140 stores a snapshot corresponding to the first virtual machine 124 with the snapshot success status, but does not store the snapshot corresponding to the second virtual machine 126 with the snapshot failure status.

Although FIG. 2 depicts the blocks 202-216 occurring in a specific order, the blocks 202-216 may occur in another order. In other implementations, each of the blocks 202-216 may also be executed in combination with other blocks and/or some blocks may be divided into a different set of blocks.

Figure 3:
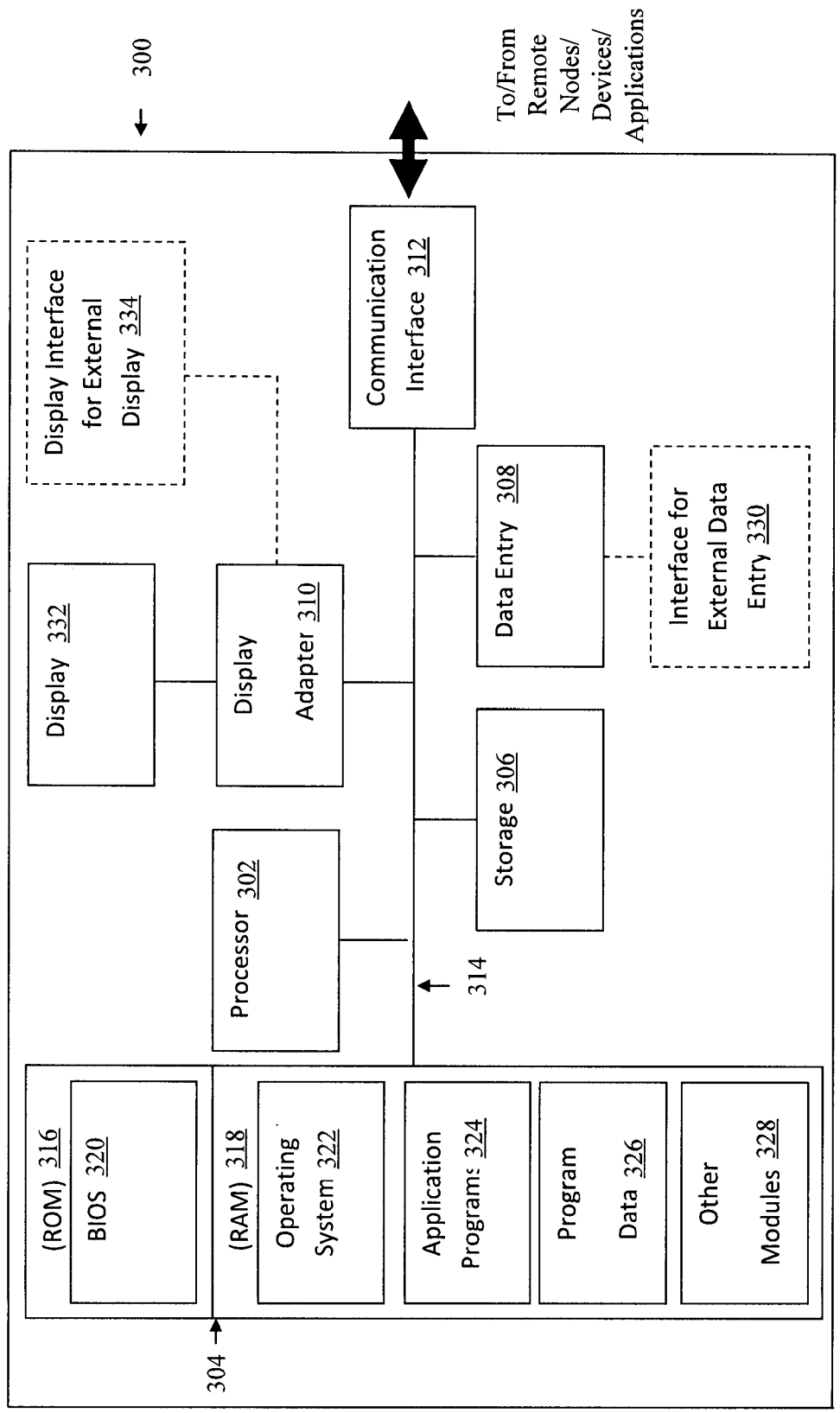
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for identifying virtual machines and errors for snapshots, the system comprising:
    a processor-based application, which when executed on a computer, will cause the processor to:
        receive, from a volume snapshot service, an error message and a corresponding component identifier associated with a backup operation;
        request a corresponding snapshot status from each component participating in the backup operation;
        receive a corresponding snapshot status from each component participating in the backup operation;
        request an error identifier from a component corresponding to a snapshot failure status;
        receive the error identifier from the component corresponding to the snapshot failure status;
        identify a virtual machine based on the component identifier; and
        output, via a user interface, a report identifying the virtual machine and the error identifier.

2. The system of claim 1, wherein the volume snapshot service comprises a partial writer backup failure feature.

3. The system of claim 1, wherein the volume snapshot service is initiated by a backup/restore application.

4. The system of claim 1, wherein the virtual machine comprises a cluster shared volume.

5. The system of claim 1, wherein the virtual machine is created and run by a hypervisor.

6. The system of claim 1, wherein the report further identifies each virtual machine participating in the backup operation and a snapshot status corresponding to each virtual machine participating in the backup operation.

7. The system of claim 1, wherein the processor-based application further causes the processor to store a snapshot corresponding to each virtual machine participating in the backup operation other than the virtual machine identified with the error identifier.

8. A computer-implemented method for identifying virtual machines and errors for snapshots, the method comprising:
    receiving, from a volume snapshot service, an error message and a corresponding component identifier associated with a backup operation;
    requesting a corresponding snapshot status from each component participating in the backup operation;
    receiving a corresponding snapshot status from each component participating in the backup operation;
    requesting an error identifier from a component corresponding to a snapshot failure status;
    receiving the error identifier from the component corresponding to the snapshot failure status;
    identifying a virtual machine based on the component identifier; and
    outputting, via a user interface, a report identifying the virtual machine and the error identifier.

9. The method of claim 8, wherein the volume snapshot service comprises a partial writer backup failure feature.

10. The method of claim 8, wherein the volume snapshot service is initiated by a backup/restore application.

11. The method of claim 8, wherein the virtual machine comprises a cluster shared volume.

12. The method of claim 8, wherein the virtual machine is created and run by a hypervisor.

13. The method of claim 8, wherein the report further identifies each virtual machine participating in the backup operation and a snapshot status corresponding to each virtual machine participating in the backup operation.

14. The method of claim 8, wherein the method further comprises storing a snapshot corresponding to each virtual machine participating in the backup operation other than the virtual machine identified with the error identifier.

15. A computer program product, comprising a non-transitory computer-readable medium having a computer-readable program code embodied therein to be executed by one or more processors, the program code including instructions to:
    receive, from a volume snapshot service, an error message and a corresponding component identifier associated with a backup operation;
    request a corresponding snapshot status from each component participating in the backup operation;

receive a corresponding snapshot status from each component participating in the backup operation;

request an error identifier from a component corresponding to a snapshot failure status;

receive the error identifier from the component corresponding to the snapshot failure status;

identify a virtual machine based on the component identifier; and output, via a user interface, a report identifying the virtual machine and the error identifier.

16. The computer program product of claim 15, wherein the volume snapshot service comprises a partial writer backup failure feature.

17. The computer program product of claim 15, wherein the volume snapshot service is initiated by a backup/restore application.

18. The computer program product of claim 15, wherein the virtual machine comprises a cluster shared volume created and run by a hypervisor.

19. The computer program product of claim 15, wherein the report further identifies each virtual machine participating in the backup operation and a snapshot status corresponding to each virtual machine participating in the backup operation.

20. The computer program product of claim 15, wherein the program code further includes instructions to store a snapshot corresponding to each virtual machine participating in the backup operation other than the virtual machine identified with the error identifier.

* * * * *